(12) United States Patent
Ueda et al.

(10) Patent No.: US 7,097,459 B2
(45) Date of Patent: Aug. 29, 2006

(54) GOLF SWING DIAGNOSIS SYSTEM

(75) Inventors: Masahiko Ueda, Hyogo (JP);
Masahide Onuki, Hyogo (JP); Hiroshi Hasegawa, Hyogo (JP)

(73) Assignee: Sri Sports Limited, Kobe (JP)

( * ) Notice: Subject to any disclaimer, the term of this patent is extended or adjusted under 35 U.S.C. 154(b) by 70 days.

(21) Appl. No.: 10/824,438

(22) Filed: Apr. 15, 2004

(65) Prior Publication Data
US 2004/0209698 A1    Oct. 21, 2004

(30) Foreign Application Priority Data
Apr. 16, 2003   (JP) ............................ 2003-112058

(51) Int. Cl.
*A63B 69/36* (2006.01)
(52) U.S. Cl. ...................... 434/252; 473/151
(58) Field of Classification Search ................ 473/140, 473/207, 222, 266, 267, 409, 151; 434/247–252
See application file for complete search history.

(56) References Cited

U.S. PATENT DOCUMENTS

| | | | |
|---|---|---|---|
| 4,137,566 A | | 1/1979 | Haas et al. |
| 4,713,686 A | * | 12/1987 | Ozaki et al. ................. 348/157 |
| 5,111,410 A | | 5/1992 | Nakayama et al. |
| 5,697,791 A | * | 12/1997 | Nashner et al. ............. 434/247 |
| 5,772,522 A | | 6/1998 | Nesbit et al. |
| 5,823,878 A | | 10/1998 | Welch |
| 5,826,578 A | * | 10/1998 | Curchod .................... 600/595 |
| 6,537,076 B1 | * | 3/2003 | McNitt et al. .............. 434/252 |
| 2002/0187846 A1 | | 12/2002 | Funk |

FOREIGN PATENT DOCUMENTS

| | | |
|---|---|---|
| EP | 0 447 712 A3 | 9/1991 |
| JP | 9-154996 A | 6/1997 |
| JP | 2974018 B2 | 6/1998 |
| JP | 2001-614 A | 1/2001 |
| WO | WO 02/067187 A1 | 8/2002 |
| WO | WO 2003/005281 A1 | 1/2003 |

OTHER PUBLICATIONS

UK Examination Report dated Jul. 29, 2005.

* cited by examiner

*Primary Examiner*—Kien Nguyen
(74) *Attorney, Agent, or Firm*—Birch, Stewart, Kolasch & Birch, LLP

(57) ABSTRACT

Reference points (M1 through M17) are specified in colors at two or more positions longitudinally spaced at a given interval on a golf club shaft (11a) and one or more positions selected from among a golfer's head and the like. A moving image of a golfer's swing is photographed by cameras (13-1, 13-2). The moving image of the swing is converted into a plurality of still images. The still images are stored in a computer (14). Evaluation items to be checked including a swing posture and a shaft angle in a range from an addressing state till an impact state are expressed by numeric values, based on coordinate data of each of the reference points (M1 through M17) disposed on a plurality of the still images. The data expressed by the numeric values are compared with judging data inputted to the computer (14) in advance as ideal values.

15 Claims, 11 Drawing Sheets

Fig. 4A
Fig. 4B
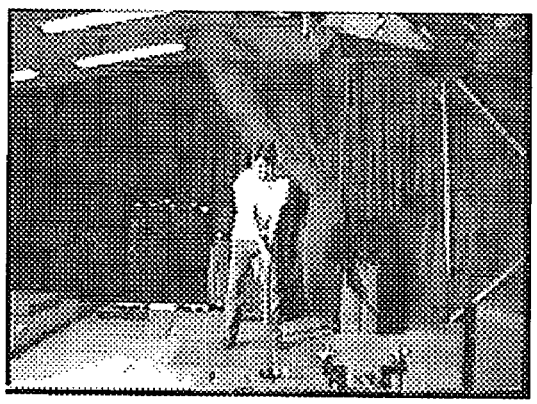
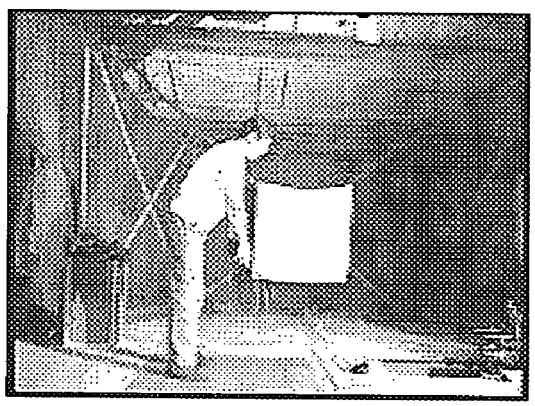
Fig. 4C
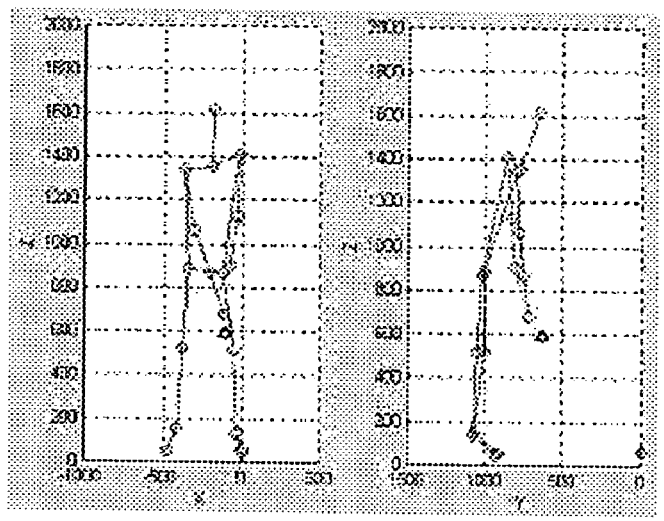

Fig. 9A
Fig. 9B
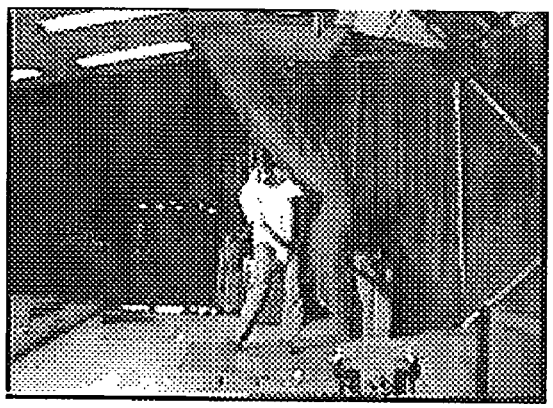
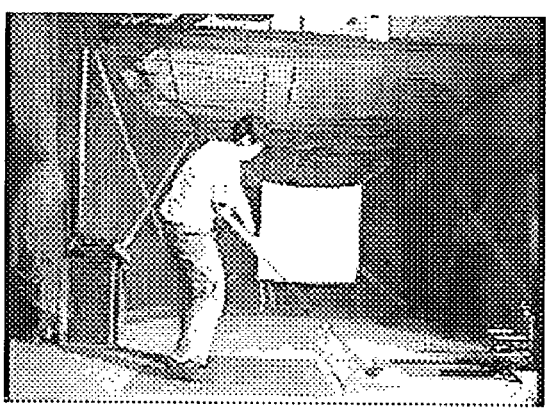
Fig. 9C
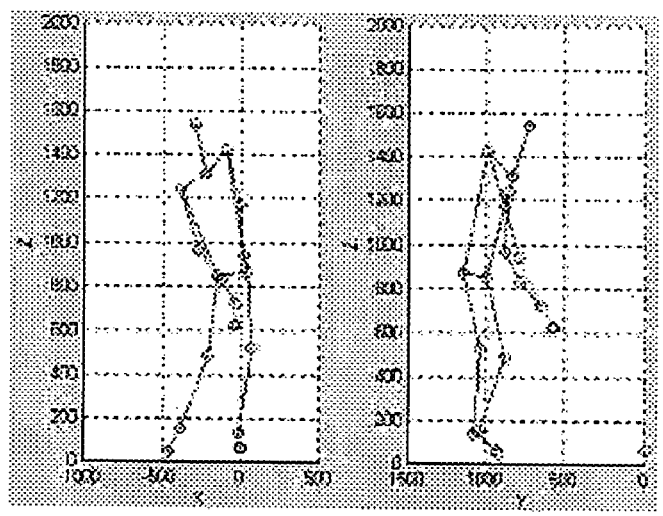

Prior Art

GOLF SWING DIAGNOSIS SYSTEM

This nonprovisional application claims priority under 35 U.S.C. § 119(a) on Patent Application No(s). 2003-112058 filed in Japan on Apr. 16, 2003, the entire contents of which are hereby incorporated by reference.

BACKGROUND OF THE INVENTION

1. Field of the Invention

The present invention relates to a method of diagnosing a golf swing and more particularly to a system of diagnosing a golfer's swing with high accuracy by using a computer.

2. Description of the Related Art

As a golf swing-analyzing apparatus, a motion-diagnosing apparatus as shown in FIG. 11 is disclosed in U.S. Pat. No. 2,794,018.

The motion-diagnosing apparatus has the TV camera 2 photographing a swing motion of a person to be diagnosed 1, a processing device 3 connected to the TV camera 2, and a CRT 4 displaying diagnosed results. Reflection tapes are bonded to the person to be diagnosed 1 as the motion points P1 through P6.

The processing device 3 has the means for converting image data transmitted from the TV camera 2 into digital signals, the means for extracting the coordinate of each of the motion points P1 through P6 from the image data, the means for computing numeric data showing the characteristic of the motion from the coordinate of each of the motion points P1 through P6, the means for evaluating obtained numeric data by comparing it with the reference numeric data, and the means for diagnosing the swing based on evaluated values.

In the swing-analyzing apparatus disclosed in Japanese Patent Laid-Open No. 2001-614 and Japanese Patent Application Laid-Open No. 9-154996, the sensor is installed on the golfer's wrist to find the angle of the wrist relative to the axial direction of a golf club so that the player's motion is detected and the player's swing is analyzed.

In Japanese Patent No. 2794018, description is made that numeric data of the angle of a golfer's arm and that of a golf club is computed from the coordinate data obtained by tracing the motion points P1 through P6. But how to utilize the golf swing-analyzing apparatus is not clear. Thus the applicant should clarify the method of diagnosing the swing. There is a high possibility that the tracing of only one motion point P1 is incapable of computing the angle of the golf club accurately. To diagnose the golfer's swing, it is necessary to trace not only the motion of the golfer's waist and wrist, but also the motion of the golfer's shoulder and other parts. That is, an inclusive diagnosis is necessary. Thus the golf swing-diagnosing method disclosed in the publication is insufficient.

Diagnosing the swing by utilizing the numeric data is described in the specification. But a professional golfer's swing is fundamentally different from an average golfer's swing in their potentials. Therefore it is meaningless to diagnose the swing by comparing the professional golfer's swing and the average golfer's swing with each other. To match the numeric data (for example, head speed) of the average golfer's swing with that of the professional golfer's swing, not the swing but the average golfer's potential, for example, physical strength should be increased.

In the swing-analyzing apparatus disclosed in Japanese Patent Laid-Open No. 2001-614 and Japanese Patent Application Laid-Open No. 9-154996, there is a possibility that the person to be diagnosed swings in a different way from her/his original way of swing owing to a feeling of physical disorder caused by the sensor installed on her/his body. In addition, the use of the sensor makes it difficult to measure motions of many positions of her/his body. Moreover the amount of information obtained by installing the sensor at only the wrist is too small to diagnose the swing accurately.

SUMMARY OF THE INVENTION

The present invention has been made in view of the above-described problems. Therefore it is an object of the present invention to diagnose a golf swing accurately by using a computer.

To solve the above-described problems, there is provided a golf swing diagnosis system including a photographing means for photographing a swing moving image in a color image when a golfer swings; a capturing means for capturing the photographed color image into a computer; a recognizing means for recognizing at least two reference points which are specified in colors on the color image of the computer and are spaced at a given interval in a longitudinal direction of a golf club shaft gripped by the golfer; and recognizing one or more reference points which are specified in colors, move during the swing, and are selected from among a golfer's head, neck, right shoulder, left shoulder, right elbow, left elbow, left wrist, right wrist, right waist, left waist, right knee, left knee, right ankle, left ankle, right toe, and left toe; a converting means for converting the swing moving image into a plurality of still images; a means for computing a plurality of evaluation items to be checked including a swing posture and a shaft angle in a range from an addressing state till an impact state to express the evaluation items by numeric values, based on coordinate data of each of the reference points, disposed on a plurality of the still images, which are discriminated in the colors, and a diagnosing means for diagnosing the golfer's swing by comparing the data expressed by numeric values with judging data inputted to the computer in advance as ideal values.

According to the above-described method, by forming the reference points to be measured on the golf club shaft at two or more positions thereof spaced from each other in the longitudinal direction thereof, it is possible to securely measure the movement of the shaft. Further by setting the reference points at mainly joints selected from the golfer's head, neck, right shoulder, left shoulder, right elbow, left elbow, left wrist, right wrist, right waist, left waist, right knee, left knee, right ankle, left ankle, right toe, and left toe, it is possible to analyze the golfer's behavior with high accuracy when the golfer swings.

By expressing the evaluation items in a specified golfer's posture by numeric values from the coordinate data of the reference points and judging whether the numeric data falls within the range of the ideal value inputted in advance by comparing both with each other. Thereby results of the diagnosis of the golfer's swing is outputted.

The swing moving image may be photographed from the addressing state till the finish state in the golfer's swing motion or from the addressing state till the impact state. Anyway the swing should be diagnosed from the addressing state till the impact state.

The specific colors to be discriminated as the reference points are colors attached to the shaft as a design, colors of golfer's clothes or colors applied to the shaft or the golfer at a photographing time.

The recognizing means discriminates the reference points by recognizing colors existing on the shaft and the golfer without applying marks thereto. Alternatively the golfer is requested to wear clothes on which predetermined colors have been disposed. Further marks or the like are installed on the shaft or the golfer as means for applying colors thereto.

The reference points which are specified in colors and move during the golfer's swing include the golfer's wrist and elbow of an arm opposite to those of the golfer's skillful arm.

It is most important to trace the movement of the golfer's arm opposite to her/his skillful arm in the golfer's swing. To do so, it is favorable to set the reference point at the golfer's wrist and the elbow (left wrist and left elbow when golfer is right-handed).

It is preferable that the number of the reference points which are specified in colors is not less than three nor more than 18.

The evaluation items to be checked include a shaft angle, an angle of the golfer's wrist, a position and an angle of the golfer's spine, both elbows, both shoulders, both waists, both knees, and grip which are computed from the coordinate data on each still image.

The golfer's swing is photographed by two cameras at a position forward from the golfer and at a position rearward from the golfer in a ball fly line to obtain a front image and a rear image in the ball fly line, whereby two-dimensional coordinate data is obtained or three-dimensional coordinate data is obtained by converting a photographed image on the computer; or swing images photographed by two or more cameras at positions other than the position forward from the golfer and the position rearward from the golfer in the ball fly line are converted into three-dimensional data on the computer to obtain coordinate data when the golfer is viewed at the position forward from the golfer and at the position rearward from the golfer in the ball fly line.

The evaluation items to be checked include a position of the golf ball, a width of the golfer's both ankles, an angle of the golfer's wrist, a position of the golfer's head, both waists, both knees and grip viewed forward from the golfer; and a position of an axis of the golfer's spine, an angle of the spine, an angle of the knee, a position of both waists, both elbows, both shoulders, both knees, and both toes, and her/his grip, and a swing plane viewed at the position rearward from the golfer in the ball fly line.

To obtain the coordinate data of the reference points when the golfer is viewed at the position forward from the golfer and at the position rearward from the golfer in the ball fly line, it is preferable to obtain coordinate data by the method of converting swing images photographed by two or more cameras at positions other than the position forward from the golfer and the position rearward from the golfer in the ball fly line into three-dimensional data on the computer in addition to the method of disposing two cameras at the position forward from the golfer and at the position rearward from the golfer in the ball fly line.

The swing can be diagnosed with high accuracy by evaluating various checking points disposed at the position forward from the golfer and at the position rearward from the golfer in the ball fly line.

When the golfer is viewed forward or/and rearward from the golfer, a swing posture of the evaluation item to be checked includes any one of an addressing state, a state in which a shaft is an eight o'clock state, a state in which an arm opposite to a skillful arm is parallel with the ground, a top state, a state in which the arm opposite to the skillful arm is parallel with the ground in a swing-down motion, a state in which the shaft is in a nine o'clock state when a movement of the shaft is regarded as a movement of a hand of a clock, and an impact state.

The eight o'clock state of the shaft means a state of a swing posture when the position of the shaft spaced at 200 mm from the grip end intersects with a perpendicular line to the right side of the golfer's right leg.

By selecting a swing posture suitable for analyzing a golfer's swinging behavior and making a judgement by comparing the numeric data computed from the coordinate data of the reference points in this swing posture and the ideal value with each other, it is possible to diagnose the swing with high accuracy without using all images of the swing.

The diagnosis means has a plurality of judging data having ideal values in dependence on handicap at golf, golf career, sex, age, height, weight, and a golfer's tendency of a hit-ball direction inputted to the computer in advance; and the diagnosis means selects appropriate judging data from a plurality of the judging data and compares the golfer's numeric data obtained by photographing the golfer's swing with the selected judging data.

By diagnosing the swing in the above-described method, it is possible to obtain optimum results of diagnosis in dependence on a personal ability. This method is capable of preventing improper results of diagnosis of a swing from being outputted. For example, it does not occur that an ideal value for adults is applied to a child.

"A golfer's tendency of a hit-ball direction" means the golfer's own peculiarity (hook or slice).

At a time of a shot of a golf ball in the photographed swing, ball-hitting conditions including a ball speed, a deviation angle, a launch angle, and a spin amount are measured.

In the above-described construction, it is possible to obtain the information of a hit ball and compare results of the diagnosis of the golfer's swinging form and the ball-hitting conditions with each other. Thereby it is possible to analyze the correlation between the golfer's form and the trajectory of the hit ball.

At least one unoperative reference point which does not move from an addressing till an impact is specified in a color to evaluate movements of the other reference points relative to the unoperative reference point.

It is preferable to set the unoperative reference point in the vicinity of the position of the golf ball. More specifically, it is preferable to set the unoperative reference point on the golf ball, a tee or a position of the ground in the vicinity of the position of the golf ball.

It is preferable to set the golf ball as the unoperative reference point. In this case, the entire golf ball may be set as the unoperative reference point or a mark applied thereto may be set as the unoperative reference point.

When the ball is recognized as the unoperative reference point, an initial movement of the ball at an impact time can be discriminated with a photographed moving image, which can be utilized as a trigger signal of the impact.

In the above-described method, to recognize the moment when the golf club head impacts against the golf ball, it is unnecessary to provide the golf ball diagnosis system with an apparatus having a sound sensor to obtain an impact sound or an apparatus having a laser sensor to measure the movement of a golf ball. Therefore it is possible to reduce the cost of the golf ball diagnosis system and carry the golf ball diagnosis system easily.

BRIEF DESCRIPTION OF THE DRAWINGS

FIG. 4 shows an addressing state, in which FIG. 4A shows an image viewed from a front side; FIG. 4B shows an image viewed at a rearward position in a ball fly line; and FIG. 4C is a plot view of coordinate data of an X-Z plane and a Y-Z plane in three-dimensional data.

FIG. 5 shows an eight o'clock state of the shaft, in which

FIG. 6 shows a state in which a left arm is horizontal, in which

FIG. 7 shows a top state, in which

FIG. 8 shows a nine o'clock state of the shaft, in which

FIG. 9 shows an impact state of the shaft, in which FIG. 9A shows an image viewed from a front side; FIG. 9B shows an image viewed at a rearward position in a ball fly line; and FIG. 9C is a plot view of coordinate data of an X-Z plane and a Y-Z plane in three-dimensional data.

DETAILED DESCRIPTION OF THE PREFERRED EMBODIMENTS

The embodiments of the present invention will be described below with reference to drawings.

The first embodiment of the present invention will be described below with reference to the drawings.

Figure 1:
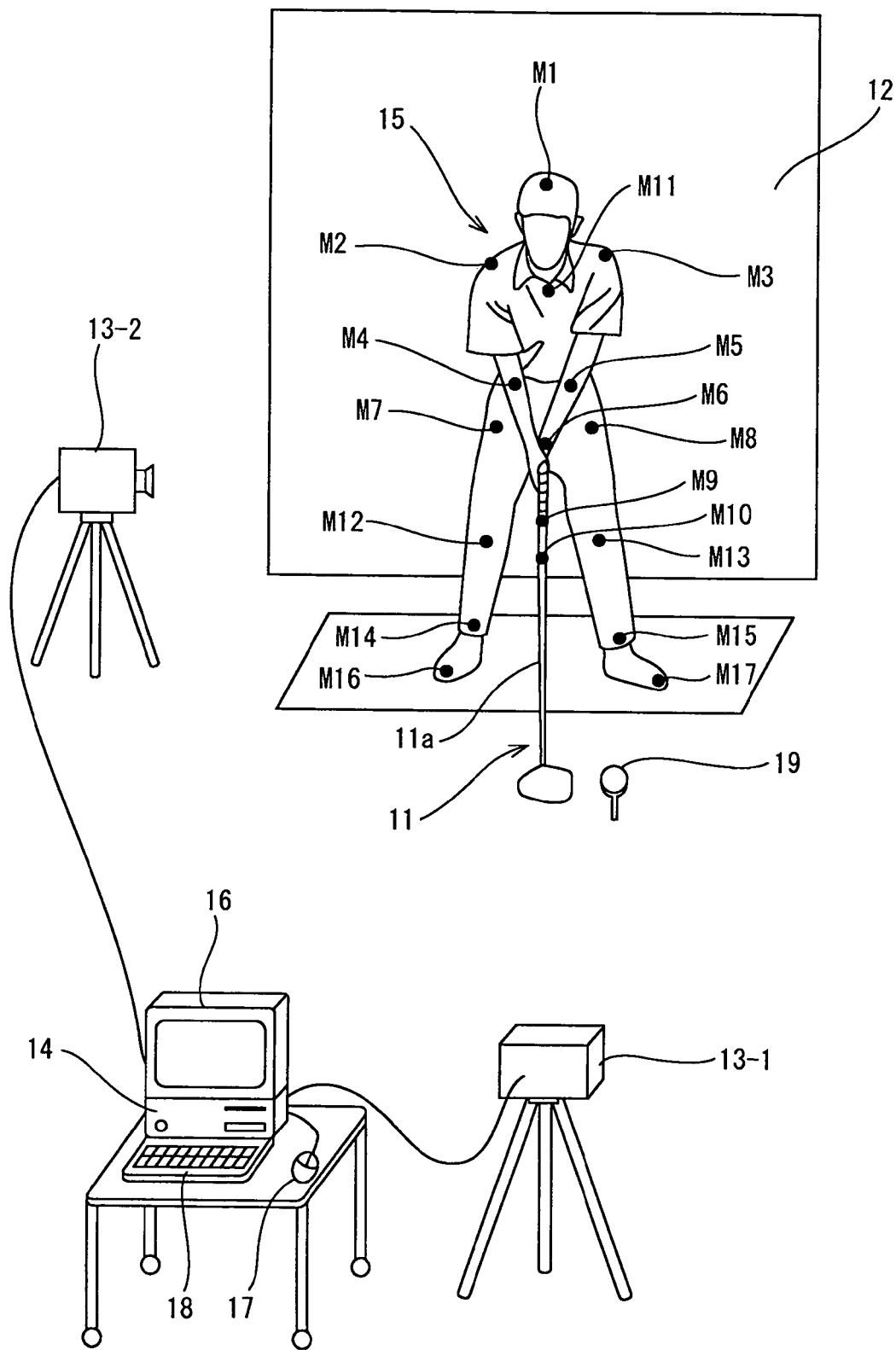
FIG. 1 shows the construction of a golf swing diagnosis system of a first embodiment of the present invention.

FIG. 1 shows a schematic view of the golf swing diagnosis system of the first embodiment. The golf swing diagnosing system has a personal computer 14; a monitor 16 serving as a display means connected to the personal computer 14; a mouse 17 and a key board 18, serving as input means, connected to the personal computer 14; and color CCD cameras 13-1 and 13-2, connected to the personal computer 14, installed at a position forward from a golfer 15 and at a position rearward from the golfer 15 in a ball fly line respectively. Fifteen marks (reference point) M1 through M8 and M11 through M17 are mounted on required positions of the golfer 15, namely, a person to be diagnoses. Two marks (reference point) Mr., M10 are mounted on a shaft 11a of a golf club 11 by spacing them at a certain interval.

In the first embodiment, the mark M9 is mounted on the shaft 11a by spacing it at 200 mm from the grip end, and the mark M10 is mounted thereon by spacing it at 400 mm from the grip end.

As the marks M1 through M17, a reflection tape or an LED (light-emitting diode) may be utilized. In the first embodiment, a colored semispherical foamed styrol is bonded to the golfer 15 and the shaft 11a to reduce a color change which occurs owing to the reflection of light. As the method of setting the color of the marks M1 through M17, the same color is not applied to the marks which are proximate to each other or may overlap each other during a golfer's swing but different colors are applied thereto. For example, different colors are applied to the head mark M1 and the left wrist mark M6; the shaft mark M9, M10; the shaft mark M9, M10, and the waist marks M7, M8.

More specifically, the colors of the marks M1 through M17 are as follows: The head mark M1: blue, the mark M2 at the right shoulder: yellow green, the mark M3 at the left shoulder: orange, the mark at the right elbow: yellow, the mark M5 at the left elbow: pink, the mark M6 at the left wrist: red, the mark M7 at the right waist: white, the mark M8 at the left waist: yellow green, the mark M9 at the side of the grip end of the shaft 11: pink, the mark M10 at the side of the club head of the shaft 11: white, the mark M11 at the neck: purple, the mark M12 at the right knee: orange, the mark M13 at the left knee: red, the mark M14 at the right ankle: red, the mark M15 at the left ankle: white, the mark M16 at the right toe: blue, and the mark M17 at the left toe: orange.

When an analog CCD camera is used, each of the color CCD cameras 13-1 and 13-2 has not less than 30 frames per second and favorably not less than 60 frames. When a high-speed digital CCD camera is used, each of the color CCD cameras 13-1 and 13-2 has not less than 60 frames per second and favorably not less than 120 frames. When a general-purpose digital CCD video camera is used, each of the color CCD cameras 13-1 and 13-2 has 30 frames per second. The shutter speed is set to not more than 1/500 s and favorably not more than 1/1000 s.

It is necessary to set the brightness of a space (3 m (length)×3 m (width)×2 m (height)) in which the swing is photographed to not less than 1000 luces, when the analog CCD camera is used and to not less than 1500 luces when the high-speed digital CCD camera is used. If an extremely bright portion is generated at the brightness of not less than 1000 luces or not less than 2000 luces, there is a possibility that halation is generated. Therefore as the brightness of the environment in which the golfer swings, it is preferable to set a uniform brightness in the range of 1000 to 1500 luces when the analog CCD camera is used and 1500 to 2500 luces when the digital CCD camera is used.

The period of time in which the color CCD cameras 13-1 and 13-2 photograph the swing is preferably about three seconds when the swing is diagnosed from an addressing state till a follow-through state, but about two seconds when the swing is diagnosed from the addressing state until an impact state.

It is preferable that a background 12 of the space in which the swing is photographed has a color different from those of the marks M1 through M17 so that the marks M1 through M17 can be extracted easily.

The computer 14 is online with the color CCD cameras 13-1, 13-2 through a LAN cable, an IEEE1394 or an I-link. Images photographed by the color CCD cameras 13-1, 13-2 are stored in the hard disk of the computer 14.

Images may be captured into the computer by an off-line by utilizing a DV tape while they are being reproduced later.

As the format of storing images, a BMP format is preferable in consideration of the quality thereof. But a JPEG format, a TIFF format, and other formats can be adopted.

Figure 2:
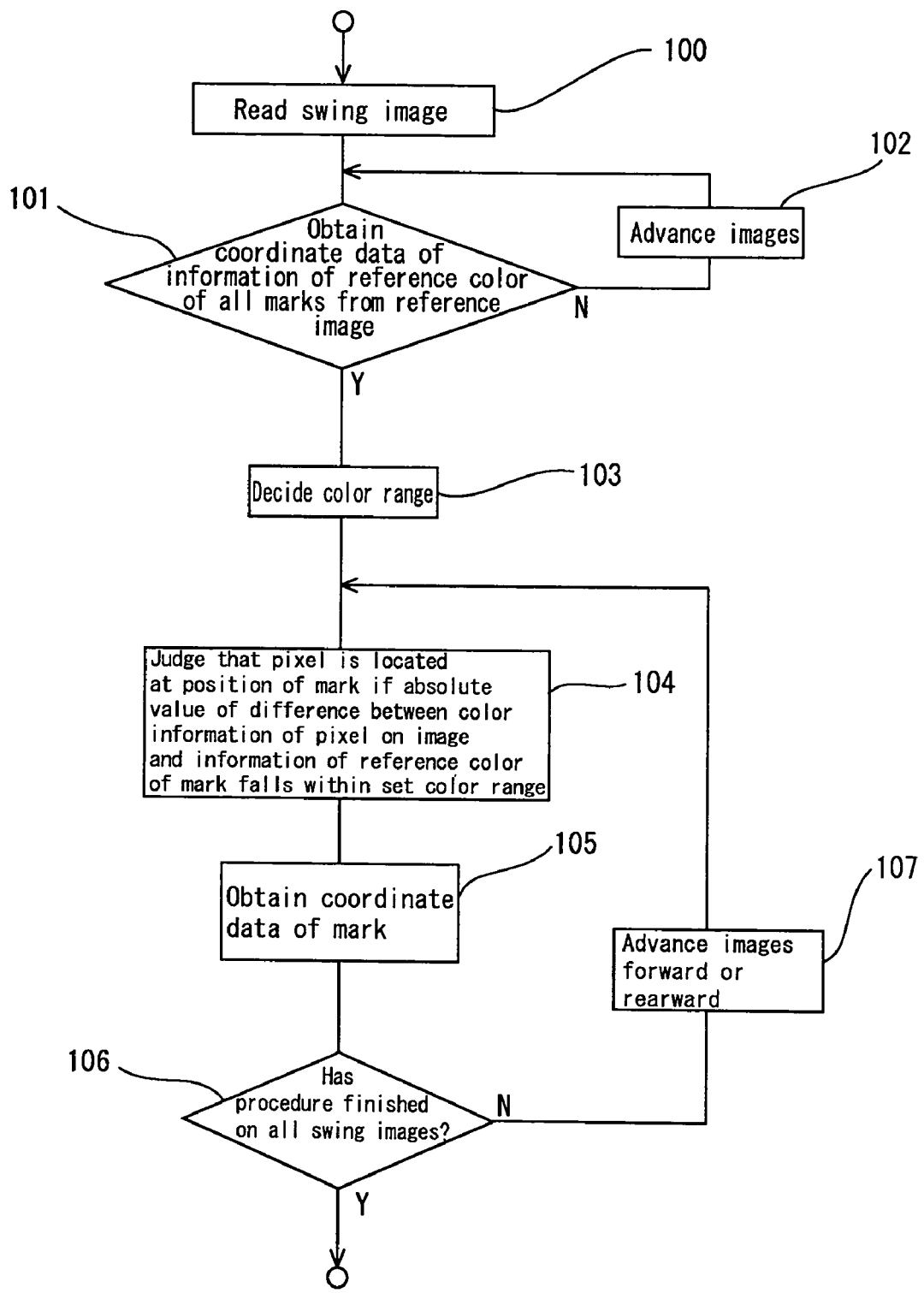
FIG. 2 is a flowchart showing the processing procedure in obtaining coordinate data.

The procedure of obtaining the coordinate data of each of the marks M1 through M17 from swing images captured into the computer 14 through the color CCD cameras 13-1, 13-2 is described below with reference to the flowchart of FIG. 2.

Initially, a moving image of the swing of the golfer 15 is captured into the computer 14 through the color CCD cameras 13-1, 13-2, to convert the moving image into a still image for each frame. The data of each still image is stored in the hard disk. Each still image of the swing of the golfer 15 from the addressing state till the finish (or impact) state is stored in a memory (step 100).

A first image in times series is set as a reference image. All the marks M1 through M17 installed on the golfer 15 and the shaft 11a are clicked with the mouse 17 so that the marks M1 through M17 are recognized (step 101). Thereby the information of the reference color of all the marks M1 through M17 and coordinate data thereof are obtained. The information of the reference color means the absolute value of red, green, and blue which are color information of the marks M1 through M17 on the reference image. When each color is expressed by 24 bits, each color has a value in the range of 0 to 255.

If any of the marks M1 through M17 cannot be recognized because it is hidden from sight with the arm or the like, the frames of the images are progressed forward until all the marks M1 through M17 can be recognized (step 102) to obtain the information of the reference color of all the marks M1 through M17 and the coordinate data thereof on a specified image.

The coordinate data can be recognized automatically by inputting the color information of all the marks M1 through M17 instead of all the marks M1 through M17 being manually recognized by using the mouse.

Thereafter a color range is set (step 103).

The color range means an error-allowable range in which in recognizing the marks M1 through M17, the color information of a candidate position on an image is regarded as the same as the information of the reference color of the marks M1 through M17. In the first embodiment, the color range is set to ±40 in a default value for each of R (red), G (green), and B (blue). For each of R (red), G (green), and B (blue), values r, g, and b of the color information of the candidate position and the values r', g', and b' of the information of the reference color are compared with each other respectively. If an error falls within ±40, the candidate position has the same color as that of the reference color. That is, the candidate position is regarded as one of the marks M1 through M17. The color range can be customized by increasing or decreasing the above default value.

Thereafter the absolute value of the difference between the color information of a pixel on the image and the reference color information of each of the marks M1 through M17 falls within the above-described color range is checked. When the absolute value falls within the above-described color range, it is determined that the pixel is located at the position of one of the marks M1 through M17 (step 107).

For example, if there is only one pixel which falls within the color range of the information of the reference color, a position where the pixel is located is admitted as the mark M1. If there is a plurality of pixels which fall within the color range of the information of the reference color, a position at which the absolute value of the difference between the color information of the pixel and the reference color information of the mark M1 is minimum is admitted as the mark M1. The coordinate data of each of the admitted marks M1 through M17 is obtained (step 105) in this manner.

If the above procedure has not finished for all the swing images (step 106), the images are progressed forward (step 107) and the above-described procedure is repeated.

If the information of the reference color of all the marks M1 through M17 and the coordinate data obtained from the image at step 101 are different from those of the first image in time series, images are progressed rearward and the above-described procedure is performed. When the above procedure has finished for all the swing images, the coordinate data of all the marks M1 through M17 in the swing motion from the addressing till the finish is obtained.

Thereafter the swing is diagnosed by using the obtained coordinate data of all the marks M1 through M17.

Figure 3:
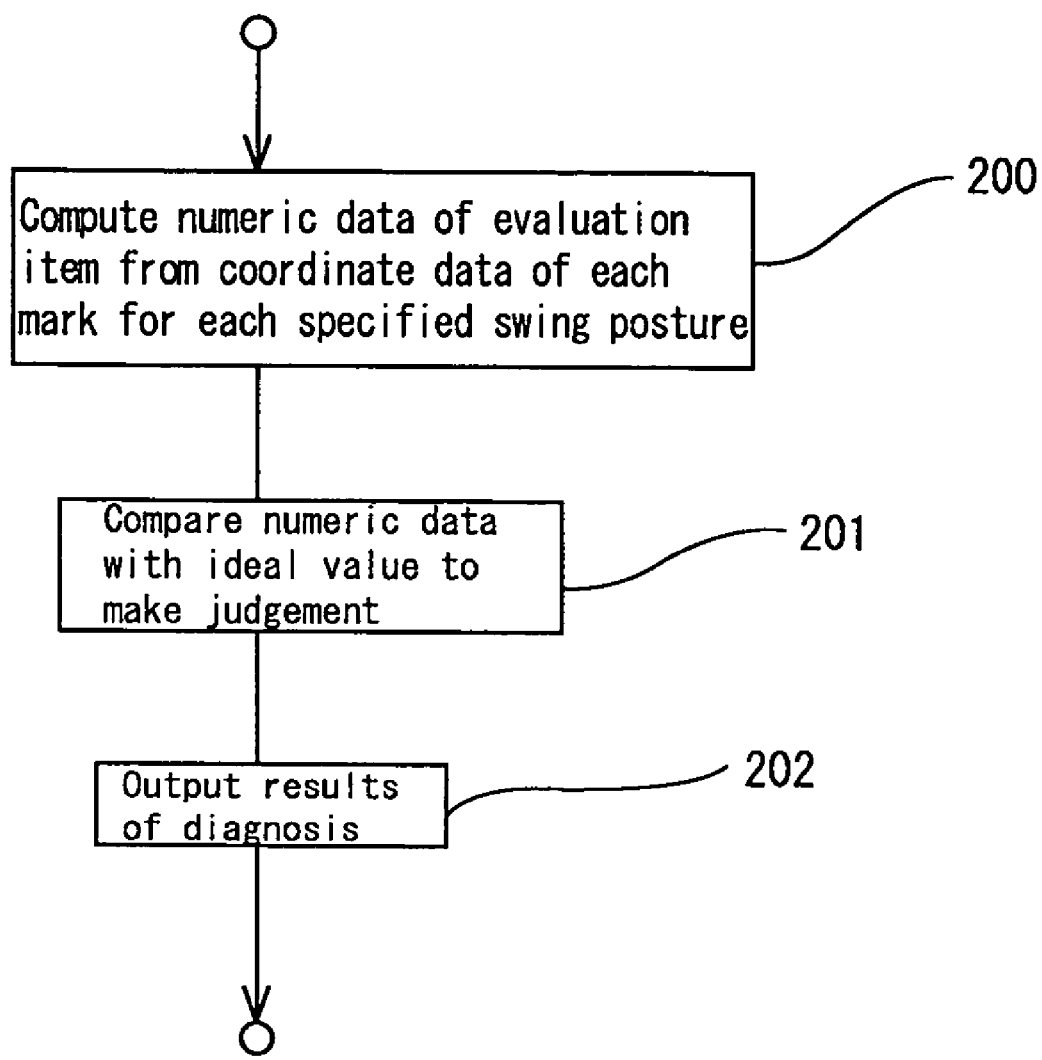
FIG. 3 is a flowchart showing the processing procedure in diagnosing a swing.

As shown in FIG. 3, numeric data regarding predetermined evaluation items is computed (step 200) from the coordinate data of each of the marks M1 through M17 obtained for each of the specified swing postures (addressing state→eight o'clock state of shaft→horizontal state of left arm→top state→left arm in horizontal state in swing-down motion→nine o'clock state of shaft→impact state). An ideal value (data for judgement) inputted in advance and the numeric data are compared with each other (step 201). Results of diagnosis are outputted (step 202).

The method of setting the ideal value of each of the evaluation items for each swing posture will be described below.

The evaluation items of the swing were checked by 50 professional golfers so that the ideal value of each of the evaluation items which will be described later agrees with their judgement.

The ball fly line is set as an X-axis. The longitudinal direction for the golfer rectangular to the ball fly line is set as a Y-axis. The vertical direction is set as a Z-axis. Regarding the coordinate, the position of the ball 19 is set as the origin; the side forward from the golfer in the ball fly line is set as the positive direction in an X-coordinate; the side rearward from the golfer is set as the positive direction in a Y-coordinate; and the side upward from the origin is set as the positive direction in a Z-coordinate.

Address State

In the addressing state shown in FIG. 4, the following evaluation items are provided when the golfer is viewed at a position forward therefrom: (1): the position of the ball. (2): The length of the stance. (3): The balance (shoulder) between the upper half of the golfer's body and the lower half thereof. (4): The balance (waist) between the upper half of the golfer's body and the lower half thereof.

As the ideal value of each of the evaluation items (1) through (4), values of X-coordinate are used. As the ideal value of the evaluation item (1), (the X-coordinate of the position of the ball 19)−(the X-coordinate of the left ankle M15)+50 mm=−30 to 30 mm. As the ideal value of the evaluation item (2), (the length between both ankles M14, M15)/(the length between both shoulders M2, M3)=1.05 to 1.35. As the ideal value of the evaluation item (3), (the midpoint between both shoulders M2, M3)−(the midpoint between both ankles M14, M15)=−60 to 0 mm. As the ideal value of the evaluation item (4), (the midpoint between both waists M7, M8)–(the midpoint between both ankles M14, M15)=−15 to 15 mm.

The following evaluation items are provided when the golfer is viewed at a position rearward therefrom in the ball fly line: Evaluation item (5): the position of the right shoulder with respect to the thenar. Evaluation item (6): the position of the right knee with respect to the thenar. Evaluation item (7): the position of the grip.

As the ideal value of each of evaluation item (5) through evaluation item (7), values of Y-coordinate are used. As the ideal value of evaluation item (5), (Y-coordinate of the right toe M16)–(the Y-coordinate of the right shoulder M2)=−100 to 100 mm. As the ideal value of evaluation item (6), (Y-coordinate of the right toe M16)–(the Y-coordinate of the right knee M12)=−25 to 25 mm. As the ideal value of evaluation item (7), (Y-coordinate of the right toe M16)–(Y-coordinate of the mark M9)–L·cos α=50 to 200 mm, where α is the angle between the shaft line (the line connecting the mark M9 and the mark M10 to each other) and the Y-axis, and L is the distance from the grip end to the mark M9.

Eight O'Clock State of Shaft

Figure 5A:
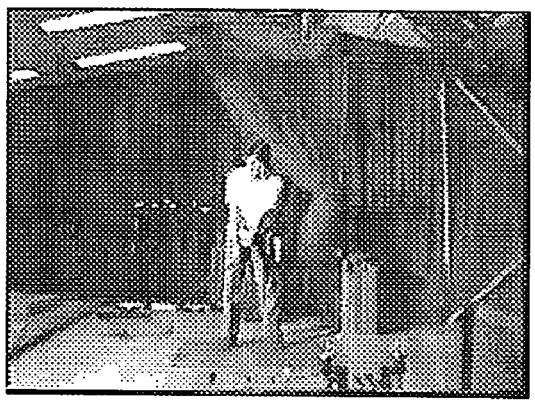
FIG. 5A shows an image viewed from a front side.
Figure 5B:
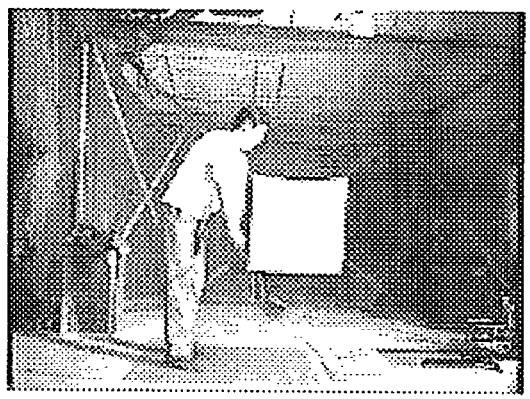
FIG. 5B shows an image viewed at a rearward position in a ball fly line.
Figure 5C:
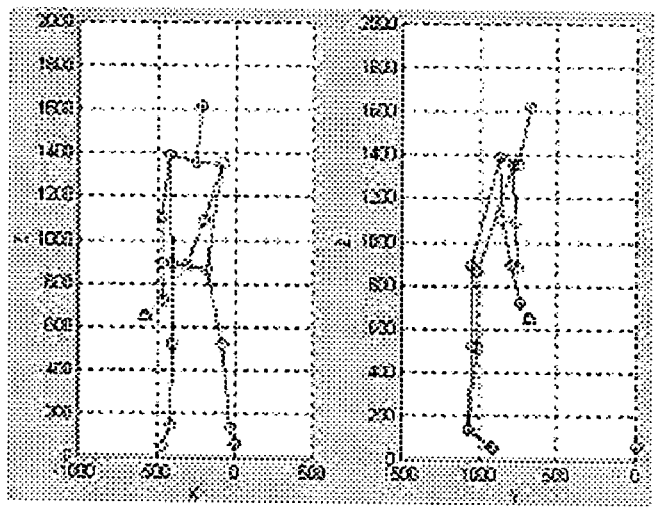
FIG. 5C is a plot view of coordinate data of an X-Z plane and a Y-Z plane in three-dimensional data.

In the eight o'clock state of the shaft shown in FIG. 5, the following evaluation items are provided when the golfer is viewed at the position forward therefrom: evaluation item (1): The grip end is oriented to the midpoint between both waists. Evaluation item (2): the angle of the shaft.

As the ideal value of each of evaluation items (1) and (2), values of X-Z coordinate are used. As the ideal value of evaluation item (1), (The X-coordinate of the midpoint between both waists M7 and M8 in the addressing state)–(The X-coordinate of the intersection of the shaft line with the straight line connecting both waists M7 and M8 to each other)=−10 to 10 mm. As the ideal value of evaluation item (2), (the angle between the shaft line and the Z-axis)–60 degrees=−10 to 10 degrees.

The eight o'clock state of the shaft means the state of the swing posture when the mark M9 intersects with a perpendicular line to the right side of the right leg.

The following evaluation items are provided when the golfer is viewed at the position rearward therefrom in a ball fly line: evaluation item (3): swing plane (a plane formed of an ideal orbit of the shaft) is traced. Evaluation item (4): the position of the grip.

As the ideal value of each of evaluation item (3) and (4), values of X-Z coordinate are used. As the ideal value of evaluation item (3), (the angle of the shaft with respect to the Y-axis of the shaft in the addressing state)–(the angle of the shaft with respect to the Y-axis at the eight o'clock state of the shaft)=−10 to 10 degrees. As the ideal value of evaluation item (4), (the distance from the midpoint between the mark M9 and the mark M10 to the shaft line in the addressing state)=−10 to 10 mm.

Left Arm in Horizontal State

Figure 6A:
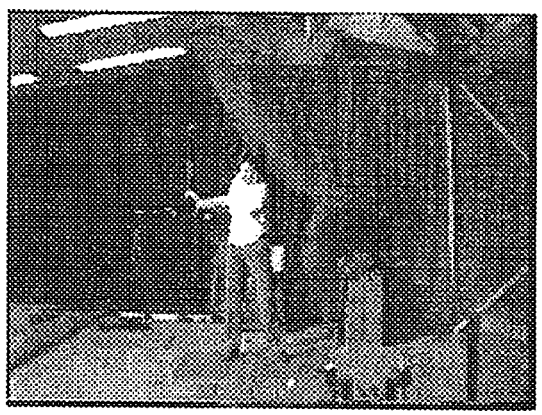
FIG. 6A shows an image viewed from a front side.
Figure 6B:
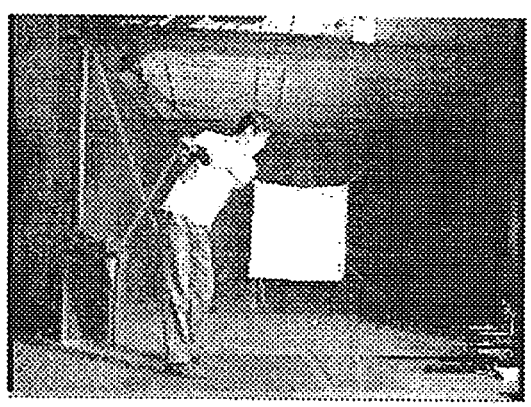
FIG. 6B shows an image viewed at a rearward position in a ball fly line.
Figure 6C:
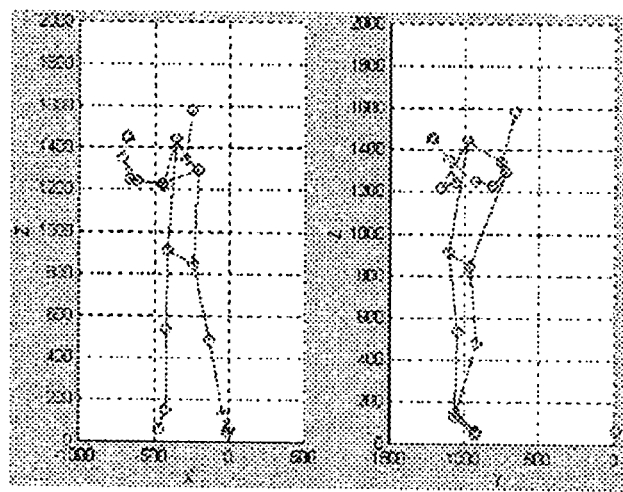
FIG. 6C is a plot view of coordinate data of an X-Z plane and a Y-Z plane in three-dimensional data.

In the state in which the left arm is in horizontal state as shown in FIG. 6, the following evaluation item is provided when the golfer is viewed at the position forward therefrom: evaluation item (1): the angle of the wrist.

As the ideal value of evaluation item (1), values of the X-Z coordinate are used. As the ideal value of evaluation item (1), the angle between (the straight line connecting the left wrist M6 and the mark M9 to each other) and (the straight line connecting the left wrist M6 and the left elbow M5 to each other)=70 to 140 degrees.

The following evaluation items are provided when the golfer is viewed at the position rearward therefrom in the ball fly line: evaluation item (2): the orientation of the grip end. Evaluation item (3): the height of both elbows. Evaluation item (4): the position of the shaft. Evaluation item (5): the angle of both shoulders.

As the ideal value of evaluation item (2) through (5), values of the Y-Z coordinate are used. Regarding evaluation item (2), (position 2/3) dividing the straight line connecting the right toe M16 and the position of the ball 19 to each other at a ratio of 2:1 (the side of the right toe M16 has "2" and the side of the ball 19 has "1") is found. Further the (intersection) of the straight line with the shaft line is found to set (position 2/3)–(intersection)=0 to 300 mm. The ideal value of evaluation item (3) is set to (Z coordinate of the left elbow M5)–(Z coordinate of the right elbow M4)=−10 to 15 mm. As the ideal value of evaluation item (4), the distance between (the straight line connecting the midpoint between the right shoulder M2 and the right elbow M4 and the position 2/3 to each other) and (the mark M9)=0 to 100 mm. As the ideal value of evaluation item (5), the angle between (the straight line connecting the right shoulder M2 and the left shoulder M3 to each other) and (the straight line connecting the midpoint between the right waist M7 and the left waist M8 and the neck M11 to each other)=80 to 100 degrees.

Top State

Figure 7A:
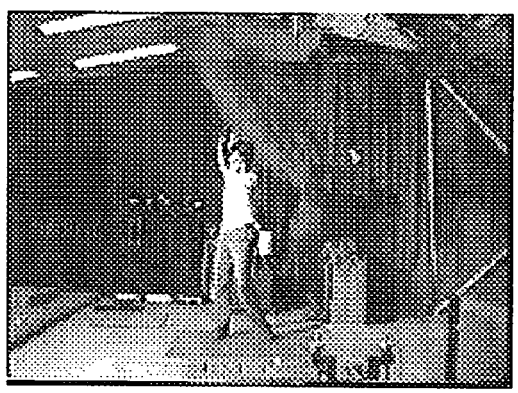
FIG. 7A shows an image viewed from a front side.
Figure 7B:
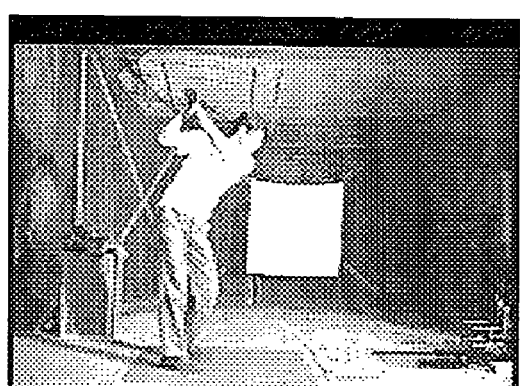
FIG. 7B shows an image viewed at a rearward position in the ball fly line.
Figure 7C:
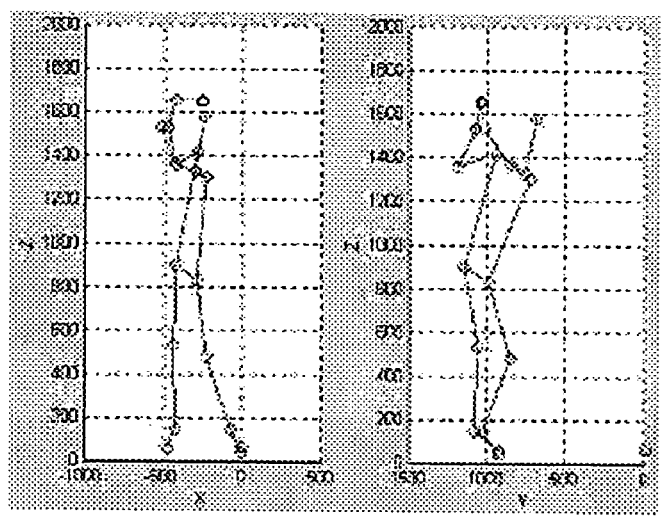
FIG. 7C is a plot view of coordinate data of an X-Z plane and a Y-Z plane in three-dimensional data.

In the state of a top shown in FIG. 7, the following evaluation items are provided when the golfer is viewed at the position forward therefrom: evaluation item (1): the degree of an over-swing.

As the ideal value of evaluation item (1), values of the X-Z coordinate are used. As the ideal value of evaluation item (1), the angle between (the shaft line (the straight line connecting the mark M9 and the mark M10 to each other)) and (minus direction in Z-axis)≦290 degrees.

The following evaluation items are provided when the golfer is viewed at the position rearward therefrom in the ball fly line: Evaluation item (2): The left knee does not project. Evaluation item (3): The right knee does not project. Evaluation item (4): the parallelism between the straight line connecting the left wrist and the right elbow to each other and the spine line (the line connecting the center between both waists and the neck to each other). Evaluation item (5): the position of the left wrist. Evaluation item (6): the parallelism between the shaft line and a target direction. Evaluation item (7): height of both elbows. Evaluation item (8): the height of the grip.

As the ideal value of evaluation items (2) through (8), values of the Y-Z coordinate are used. As the ideal value of evaluation item (2), (the left knee M13 in the addressing state)–(left knee M13 in the top state)=50 to 210 mm. As evaluation item (3), (right knee M12 in the addressing state)–(right knee M12 in the top state)=−30 to 10 mm. As evaluation item (4), (the angle between the straight line connecting the left wrist M6 and the right elbow M4 to each other and the Y-axis)–(the angle between the straight line connecting the center of both waists M7 and M8 and the neck M11 to each other and the Y-axis)=−50 to 50 degrees. As evaluation item (5), (Y-coordinate of the left wrist M6)–(Y-coordinate of the right shoulder M2)=−150 to 150 mm. As evaluation item (6), the angle between (the shaft line (the straight line connecting the mark M9 and the mark M10 to each other) and (X-axis)=−30 to 30 degrees. As evaluation item (7), (Z-coordinate of the left elbow M5)–(Z-coordinate of the right elbow M4)=−30 to 30 mm. As evaluation item (8), (Z-coordinate of the left wrist M6)/(Z-coordinate of the left shoulder M3)=1.15 to 1.25

Horizontal State of Left Arm Moving Downward

When the left arm is in a horizontal state in a swing-down motion, the following evaluation items are provided when the golfer is viewed at the position rearward therefrom in the ball fly line: evaluation item (1): The shaft line should be parallel to an original shaft line (shaft line at addressing time). Evaluation item (2): the position of the grip with respect to the original shaft line.

As the ideal value of evaluation items (1) and (2), values of the X-Z coordinate are used. As the ideal value of evaluation item (1), the angle between (the straight line connecting the mark M9 and the mark M10 in the addressing state to each other) and (the straight line connecting the mark M9 and the mark M10 to each other when the left arm is in the horizontal state in the swing-down motion)=−20 to 30 degrees. As the ideal value of evaluation item (2), the distance between (the midpoint between the mark M9 and the mark M10) and (the straight line connecting the mark M9 and the mark M10 in the addressing state to each other)=−300 to 100 mm.

Nine O'Clock State of Shaft

Figure 8A:
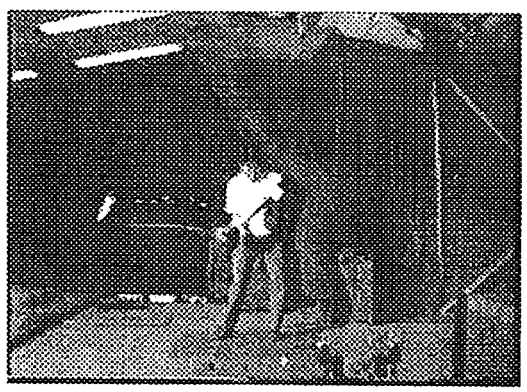
FIG. 8A shows an image viewed from a front side.
Figure 8B:
FIG. 8B shows an image viewed at a rearward position in a ball fly line.
Figure 8C:
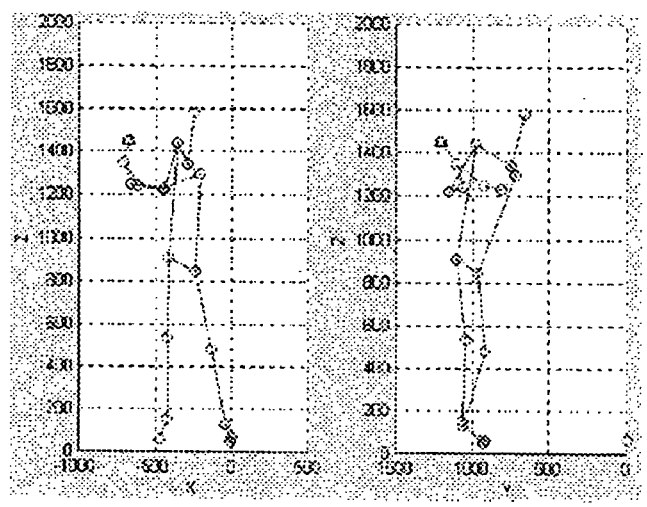
FIG. 8C is a plot view of coordinate data of an X-Z plane and a Y-Z plane in three-dimensional data.

In the nine o'clock state of the shaft shown in FIG. 8, the following evaluation item (1) is provided when the golfer is viewed at the position forward therefrom: The angular change of the wrist from the state where the left arm is in the horizontal state in the swing-down motion till the state in which the shaft is in the nine o'clock state.

As the ideal value of evaluation item (1), values of the X-Z coordinate are used. As the ideal value of evaluation item (1), the difference between the angle between (the straight line connecting the left wrist M6 and the mark M9 to each other) and (the straight line connecting the left wrist M6 and the left elbow M5 to each other) when the left arm is in the horizontal state and the angle between (the straight line connecting the left wrist M6 and the mark M9 to each other) and (the straight line connecting the left wrist M6 and the left elbow M5 to each other) when the shaft is in the nine o'clock state≦40 degrees.

The following evaluation item (2) is provided when the golfer is viewed at the position rearward therefrom in the ball fly line: (2): The shaft line is on a swing plane (plane formed with an ideal orbit of the shaft).

As the ideal value of (2), values of the Y-Z coordinate are used. As the ideal value of (2), the distance between (the straight line connecting the mark M9 and the mark M10 in the addressing state to each other) and (the midpoint between the mark M9 and the mark M10 when the shaft is in the nine o'clock state)=−60 to 260 mm Impact State In an impact state shown in FIG. 9, the following evaluation items are provided when the golfer is viewed at the position forward therefrom: (1): The golfer's head is rearward from the position of the ball. (2): The right knee during the swinging motion is in a movable range in the X-direction. (3): Movement of the golfer's weight from the top state to the impact state. (4): The movement amount of the coccyx (midpoint between both waists) during the swinging motion. The item (4) is divided into (4)-1 through (4)-4 in dependence on the X-direction, the Z-direction, the top state, and the impact state.

As the ideal value of each of the evaluation items (1) through (4), values of X-Z coordinate are used. As the ideal value of evaluation item (1), (the X-coordinate of the ball 19)−(the X-coordinate of the head M1)≧0. As the ideal value of (2), (the X-coordinate of the right knee M12)−(the X-coordinate of the right toe M16−50 mm)≧0. As the ideal value of (3), (the midpoint between the X-coordinate of both knees M12 and M13 in the impact state)−(the midpoint between the X-coordinate of both knees M12 and M13 in the top state)=150 to 300 mm. As the ideal value of (4)-1, (the midpoint between the X-coordinate of both waists M7 and M8 in the top state)−(the midpoint between the X-coordinate of both waists M7 and M8 in the addressing state)=−150 to 20 mm. As the ideal value of (4)-2, (the Z-coordinate of the midpoint between both waists M7 and M8 in the top state)−(the Z-coordinate of the midpoint between both waists M7 and M8 in the addressing state)=−65 to −20 mm. As the ideal value of (4)-3, (the X-coordinate of the midpoint between both waists M7 and M8 in the impact state)−(the X-coordinate of the midpoint between both waists M7 and M8 in the addressing state)=50 to 220 mm. As the ideal value of (4)-4, (the Z-coordinate of the midpoint between both waists M7 and M8 in the impact state)−(the Z-coordinate of the midpoint between both waists M7 and M8 in the addressing state)=−30 to 40 mm.

The following evaluation items are provided when the golfer is viewed at the position rearward therefrom in the ball fly line: evaluation item (5): change of the spine angle (the angle between the line connecting the midpoint between both waists and the neck to each other and the line connecting the waist and the knee to each other). Evaluation item (6): change of the knee angle (the angle between the line connecting the right knee and the midpoint between both waists to each other and the line connecting the knee and the ankle to each other). Evaluation item (7): the rotation amount of the waist. Evaluation item (8): the rotation amount of the shoulder.

As the ideal value of evaluation items (5) and (6), values of the Y-Z coordinate are used. As the ideal value of evaluation item (5), (the angle between the line connecting the midpoint between both waists M7 and M8 and the neck M11 to each other and the line connecting the midpoint between both waists M7 and M8 and the right knee M12 to each other in the impact state)−(the angle between the line connecting the midpoint between both waists M7 and M8 and the neck M11 to each other and the line connecting the midpoint between both waists M7 and M8 and the right knee M12 to each other in the addressing state)=−20 to 15 degrees. As the ideal value of evaluation item (6), (the angle between the line connecting the right knee M12 and the midpoint between both waists M7 and M8 to each other and the line connecting the right knee M12 and the right ankle M14 to each other in the impact state)−(the line connecting the right knee M12 and the midpoint between both waists M7 and M8 to each other and the line connecting the right knee M12 and the right ankle M14 to each other in the addressing state)=−35 to 0 degree. As the ideal value of evaluation values (7) and (8), values of X-Y coordinate are used. As the ideal value of evaluation item (7), the angle between (the straight line connecting the right waist M7 and the left waist M8 to each other) and (X-axis)=35 to 55 degrees. As the ideal value of evaluation item (8), the angle between (the line connecting the right shoulder M2 and the left shoulder M3 to each other) and (X-axis)=15 to 30 degrees.

As described above, for each of the swing postures (addressing state→eight o'clock state of shaft→left arm in horizontal state→top state→left arm in horizontal state in down-swing motion→nine o'clock state of shaft→impact state), the numeric data of each of the above-described evaluation items in the golfer's swing and the above-described ideal value are compared with each other to diagnose whether the numeric data falls within the ideal value in each evaluation item.

The place where the golf swing diagnosis system is installed is not limited to a specific place, but can be installed in any place where a golf club can be swung, for example, a golf course, a golf practice range or a place surrounded with a net.

It is favorable that the ideal value is widely set in dependence on golfer's height, weight, age, and career and the like. It is favorable that the golf swing diagnosis system is automated. That is, it is favorable that the input and output of personal information (name, height, weight, age, golfer's defects to be corrected, and desired trajectory), display of results, and results of diagnosis are executed by touching monitors of the computer. But the golf swing diagnosis system is semi-automated by operator's input.

At the time of a shot of the ball 19 in the photographed swing, it is suitable to measure ball-hitting conditions including a ball speed, a deviation angle, a launch angle, and a spin amount; and incident conditions (head speed, incident angle of club head, orbit of swing, and impact point) of the golf club. Thereby it is possible to analyze the correlation between the golfer's form and the trajectory of a hit ball.

As a modification of the first embodiment, the movement of the marks (reference point) M1 through M17 may be evaluated by setting the ball 19 as an unoperative reference point.

That is, the movement of the marks should be grasped by obtaining the coordinate of the position of each of the marks M1 through M17 relative to the ball 19 (unoperative reference point) in the swing. Thereby the swing is diagnosed by comparing the coordinate of the position of each of the marks M1 through M17 with the ideal value.

To allow the ball 19 to be recognized, the ball 19 is clicked with the mouse 17 on the monitor. Further the ball 19 may be automatically recognized by image processing.

By allowing the ball 19 to be recognized as the unoperative reference point, an initial movement of the ball at an impact time can be discriminated, which can be utilized as a trigger signal of the impact. More specifically, the time of the frame prior by one frame to the frame of a photographed image of the initial movement of the ball 19 should be recognized as an impact time.

Thereby to recognize the moment when the golf club head impacts against the golf ball, it is unnecessary to provide the golf ball diagnosis system with an apparatus having a sound sensor to obtain an impact sound or an apparatus having a laser sensor to measure the movement of a golf ball. Therefore it is possible to reduce the cost of the golf ball diagnosis apparatus and the burden of carrying it.

The place where the unoperative reference point is set is not limited to the ball 19 but may be set on a tee or a position on the ground near the ball 19.

Figure 10:
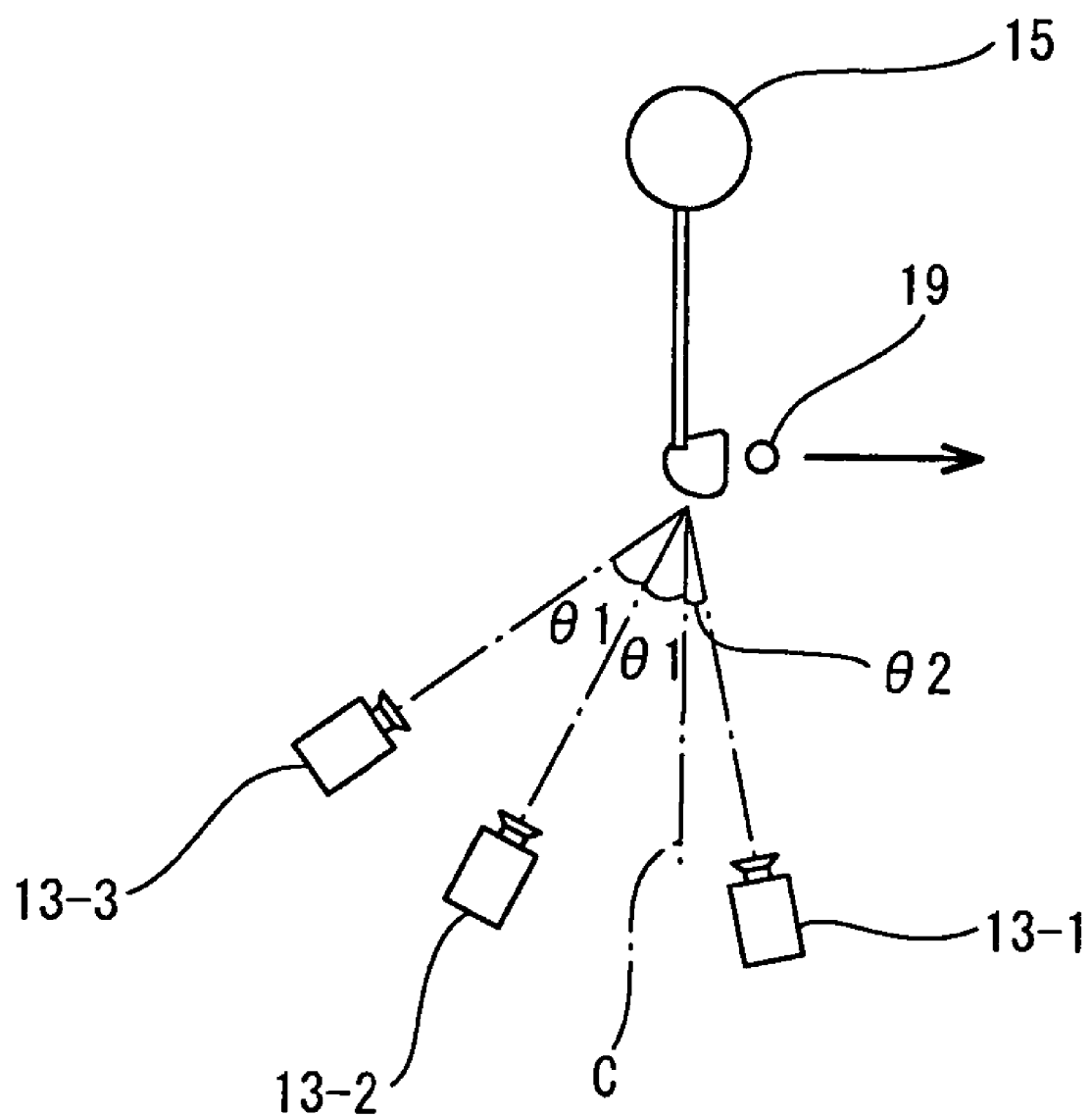
FIG. 10 is a schematic plan view showing an apparatus of a second embodiment.
Figure 11:
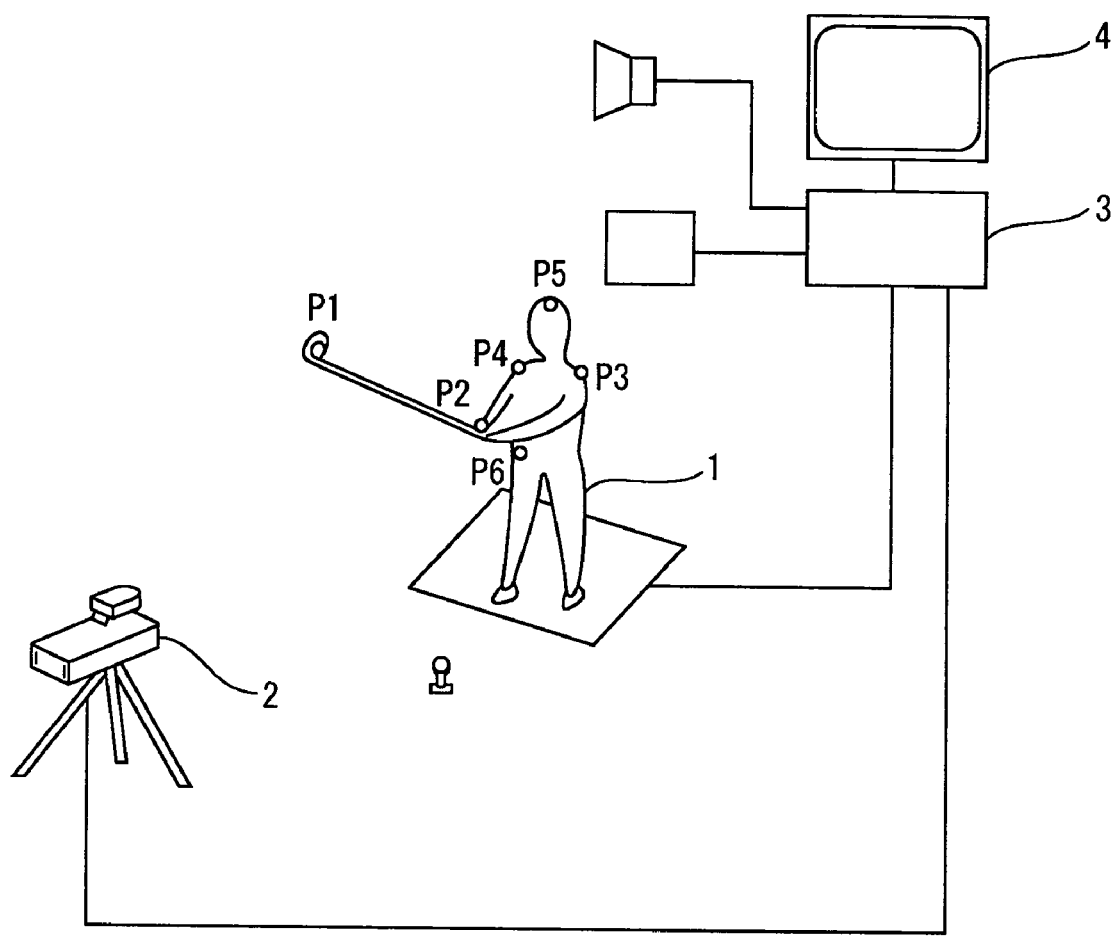
FIG. 11 shows the construction of a conventional diagnosis apparatus.

FIG. 10 shows a second embodiment.

In the second embodiment, the golf swing diagnosis system has three color CCD cameras 13-1 through 13-3. More specifically, the color CCD camera 13-1 is installed at a position forming an angle of $\theta 2$ from a line C extended forward from the golfer 15 toward a ball fly line; the color CCD camera 13-2 is installed at a position forming an angle of $\theta 1$ from the line C toward the rear side in the ball fly line; and the color CCD camera 13-3 is installed at a position forming an angle of $\theta 1$ from the color CCD camera 13-2 toward the rear side in the ball fly line. In the second embodiment, $\theta 1$ is set to 30 degrees, and $\theta 2$ is set to 15 degrees.

Two-dimensional coordinate data obtained from the color CCD cameras 13-1 through 13-3 is converted into three-dimensional coordinate data by using a DLT method. The golf swing diagnosis system is provided with the three color CCD cameras 13-1 through 13-3. Thus even if the marks M1 through M17 is hidden from the sight of the camera 13-1 with the golfer's arm or the like during a swing, the marks M1 through M17 can be recognized by the other two cameras. By obtaining the coordinate data three-dimensionally, it is possible to analyze the swing by viewing the swing from the front, the rear, and obliquely.

The numeric data for each of the evaluation items of the first embodiment is computed from the three-dimensional coordinate data and compared with ideal value inputted in advance.

Other construction and the procedure are similar to those of the first embodiment. Thus description thereof is omitted herein.

EXAMPLES

Examples of the first embodiment are described below.

One professional golfer and five unprofessional golfers A through E were requested to swing. Tables 1 and 2 show results of diagnosis made by the diagnosis system.

TABLE 1-1

| Front image | | | | Professional golfer | |
|---|---|---|---|---|---|
| Swing | | Ideal value | | Numeric | |
| posture | Evaluation item | Minimum | Maximum | data | Diagnosis |
| Address | Ball position (mm) | −30 | 30 | −25 | ◯ |
| | Length of stance | 1.05 | 1.35 | 1.2 | ◯ |
| | Balance between upper half and lower half (shoulder) (mm) | −60 | 0 | −30 | ◯ |
| | Balance between upper half and lower half (waist) (mm) | −15 | 15 | 9 | ◯ |
| Shaft: 8 o'clock state | Whether grip end is oriented to midpoint between both waists (mm) | −10 | 10 | −5 | ◯ |
| | Angle of shaft (degree) | −10 | 10 | −5.6 | ◯ |
| Left arm: horizontal | Angle of wrist (degree) | 70 | 140 | 120 | ◯ |
| Top state | Degree of over-swing (degree) | — | 290 | 240 | ◯ |

TABLE 1-1-continued

| Swing posture | Evaluation item | Front image | | Professional golfer | |
|---|---|---|---|---|---|
| | | Ideal value | | Numeric data | Diagnosis |
| | | Minimum | Maximum | | |
| Shaft: 9 o'clock state | Angular change of wrist (degree) | — | 40 | 20 | ○ |
| Impact state | Head should be rearward from ball (mm) | 0 | — | 185 | ○ |
| | Right knee during swinging should be in movable range in X-direction (mm) | 0 | — | 110 | ○ |
| | Movement of weight from top state to impact state (mm) | 150 | 300 | 240 | ○ |
| | Movement amount of coccyx (top state-address state) X(mm) | −150 | 20 | −67 | ○ |
| | Movement amount of coccyx (top state-address state) Z(mm) | −65 | 20 | −22 | ○ |
| | Movement amount of coccyx (impact state-address state) X(mm) | 50 | 220 | 150 | ○ |
| | Movement amount of coccyx (impact state-address state) Z(mm) | −30 | 40 | 10 | ○ |

TABLE 1-2

| Swing posture | Evaluation item | Professional golfer A | | Professional golfer B | |
|---|---|---|---|---|---|
| | | Numeric data | Diagnosis | Numeric data | Diagnosis |
| Address | Ball position (mm) | −134 | X | 5 | ○ |
| | Length of stance | 1.61 | X | 0.9 | X |
| | Balance between upper half and lower half (shoulder) (mm) | −27 | ○ | −32 | ○ |
| | Balance between upper half and lower half (waist) (mm) | 0 | ○ | 5 | ○ |
| Shaft: 8 o'clock state | Whether grip end is oriented to midpoint between both waists (mm) | −60 | X | 20 | ○ |
| | Angle of shaft (degree) | 20 | X | −7 | ○ |
| Left arm: horizontal | Angle of wrist (degree) | 147 | X | 122 | ○ |
| Top state | Degree of over-swing (degree) | 300 | X | 250 | ○ |
| Shaft: 9 o'clock state | Angular change of wrist (degree) | 11 | ○ | 22 | ○ |
| Impact state | Head should be rearward from ball (mm) | 125 | ○ | 112 | ○ |
| | Right knee during swinging should be in movable range in X-direction (mm) | 57 | ○ | −47 | X |
| | Movement of weight from top state to impact state (mm) | 223 | ○ | 192 | ○ |
| | Movement amount of coccyx (top state-address state) X(mm) | 53 | ○ | −120 | ○ |
| | Movement amount of coccyx (top state-address state) Z(mm) | −33 | ○ | −24 | ○ |
| | Movement amount of coccyx (impact state-address state) X(mm) | 175 | ○ | 210 | ○ |
| | Movement amount of coccyx (impact state-address state) Z(mm) | −23 | ○ | 23 | ○ |

TABLE 1-3

| Swing posture | Evaluation item | Professional golfer C | | Professional golfer D | |
|---|---|---|---|---|---|
| | | Numeric data | Diagnosis | Numeric data | Diagnosis |
| Address | Ball position (mm) | −22 | ○ | 24 | ○ |
| | Length of stance | 1.0 | X | 1.39 | X |
| | Balance between upper half and lower half (shoulder) (mm) | 26 | X | −22 | ○ |

TABLE 1-3-continued

| | Front image | Professional golfer C | | Professional golfer D | |
|---|---|---|---|---|---|
| Swing posture | Evaluation item | Numeric data | Diagnosis | Numeric data | Diagnosis |
| | Balance between upper half and lower half (waist) (mm) | −7 | ○ | 2 | ○ |
| Shaft: 8 o'clock state | Whether grip end is oriented to midpoint between both waists (mm) | 70 | X | −11 | ○ |
| | Angle of shaft (degree) | −23 | X | −8 | ○ |
| Left arm: horizontal | Angle of wrist (degree) | 111 | ○ | 157 | X |
| Top state | Degree of over-swing (degree) | 277 | ○ | 234 | ○ |
| Shaft: 9 o'clock state | Angular change of wrist (degree) | 13 | ○ | 48 | X |
| Impact state | Head should be rearward from ball (mm) | 103 | ○ | 140 | ○ |
| | Right knee during swinging should be in movable range in X-direction (mm) | 52 | ○ | 38 | ○ |
| | Movement of weight from top state to impact state (mm) | 160 | ○ | 220 | ○ |
| | Movement amount of coccyx (top state-address state) X(mm) | −135 | ○ | −212 | X |
| | Movement amount of coccyx (top state-address state) Z(mm) | −51 | ○ | 13 | ○ |
| | Movement amount of coccyx (impact state-address state) X(mm) | 80 | ○ | 120 | ○ |
| | Movement amount of coccyx (impact state-address state) Z(mm) | 55 | X | 2 | ○ |

TABLE 1-4

| | Front image | Professional golfer E | |
|---|---|---|---|
| Swing posture | Evaluation item | Numeric data | Diagnosis |
| Address | Ball position (mm) | 93 | X |
| | Length of stance | 1.12 | ○ |
| | Balance between upper half and lower half (shoulder) (mm) | −11 | ○ |
| | Balance between upper half and lower half (waist) (mm) | −4 | ○ |
| Shaft: 8 o'clock state | Whether grip end is oriented to midpoint between both waists (mm) | −32 | ○ |
| | Angle of shaft (degree) | 7 | ○ |
| Left arm: horizontal | Angle of wrist (degree) | 133 | ○ |
| Top state | Degree of over-swing (degree) | 289 | ○ |
| Shaft: 9 o'clock state | Angular change of wrist (degree) | 32 | ○ |
| Impact state | Head should be rearward from ball (mm) | 89 | ○ |
| | Right knee during swinging should be in movable range in X-direction (mm) | 86 | ○ |
| | Movement of weight from top state to impact state (mm) | 270 | ○ |
| | Movement amount of coccyx (top state-address state) X(mm) | −107 | ○ |
| | Movement amount of coccyx (top state-address state) Z(mm) | −12 | ○ |
| | Movement amount of coccyx (impact state-address state) X(mm) | 210 | ○ |
| | Movement amount of coccyx (impact state-address state) Z(mm) | −28 | ○ |

TABLE 2-1

| | Image photographed rearward in ball fly line | | | Professional golfer | |
|---|---|---|---|---|---|
| | | Ideal value | | Numeric | |
| Swing posture | Evaluation item | Minimum | Maximum | data | Diagnosis |
| Address | Position of right shoulder with respect to thenar (mm) | — | 100 | 87 | ○ |
| | Position of right knee with respect to thenar (mm) | −25 | 25 | 15 | ○ |
| | Position of grip (mm) | 50 | 200 | 150 | ○ |

TABLE 2-1-continued

| | Image photographed rearward in ball fly line | | | Professional golfer | |
|---|---|---|---|---|---|
| | | Ideal value | | Numeric | |
| Swing posture | Evaluation item | Minimum | Maximum | data | Diagnosis |
| Shaft: 8 o'clock state | Original plane of shaft is traced (degree) | −10 | 10 | 2 | ○ |
| | Position of grip (mm) | −10 | 10 | 15 | ○ |
| Left arm: horizontal | Orientation of grip end | −300 | 0 | −134 | ○ |
| | Height of both elbows (mm) | −10 | 15 | −6.2 | ○ |
| | Position of shaft (mm) | 0 | 100 | 34 | ○ |
| | Position of shoulder (degree) | 80 | 100 | 83 | ○ |
| Top state | Left knee should not project | 50 | 210 | 185 | ○ |
| | Right knee should not project | −30 | 10 | 0 | ○ |
| | Parallelism between straight line connecting left wrist and right elbow to each other and spine line (degree) | −50 | 50 | 49 | ○ |
| | Position of left wrist (mm) | −150 | 150 | 146 | ○ |
| | Parallelism between shaft line and target direction (degree) | −30 | 30 | 18 | ○ |
| | Height of both elbows (mm) | −30 | 30 | −17 | ○ |
| | Height of grip (ratio of height of left wrist to height of left shoulder) | 1.15 | 1.25 | 1.24 | ○ |
| Left arm: horizontal in swing-down motion | Shaft line should be parallel with original shaft line (degree) | −20 | 30 | 20 | ○ |
| | Position of grip (mm) | −300 | 100 | −120 | ○ |
| Shaft: 9 o'clock state | Shaft line is on swing plane (mm) | −60 | −260 | −160 | ○ |
| Impact | Change of spine angle (degree) | −20 | 15 | −11 | ○ |
| | Change of knee angle (degree) | −35 | 5 | −19 | ○ |
| | Rotation amount of waist (degree) | 35 | 55 | 46 | ○ |
| | Rotation amount of shoulder (degree) | 15 | 30 | 18 | ○ |

TABLE 2-2

| | Image photographed rearward in ball fly line | Professional golfer A | | Professional golfer B | |
|---|---|---|---|---|---|
| Swing posture | Evaluation item | Numeric data | Diagnosis | Numeric data | Diagnosis |
| Address | Position of right shoulder with respect to thenar (mm) | 52 | ○ | 152 | X |
| | Position of right knee with respect to thenar (mm) | 2 | ○ | −34 | X |
| | Position of grip (mm) | 170 | ○ | 380 | X |
| Shaft: 8 o'clock state | Original plane of shaft is traced (degree) | 7 | ○ | 25 | X |
| | Position of grip (mm) | 16 | ○ | 42 | X |
| Left arm: horizontal | Orientation of grip end | −170 | ○ | −270 | ○ |
| | Height of both elbows (mm) | 5 | ○ | −7 | ○ |
| | Position of shaft (mm) | 55 | ○ | 70 | ○ |
| | Position of shoulder (degree) | 87 | ○ | 88 | ○ |
| Top state | Left knee should not project | 155 | ○ | 174 | ○ |
| | Right knee should not project | −82 | X | 7 | ○ |
| | Parallelism between straight line connecting left wrist and right elbow to each other and spine line (degree) | 20 | ○ | 58 | X |
| | Position of left wrist (mm) | 104 | ○ | 213 | X |
| | Parallelism between shaft line and target direction (degree) | 12 | ○ | −7 | ○ |
| | Height of both elbows (mm) | −18 | ○ | 55 | X |
| | Height of grip (ratio of height of left wrist to height of left shoulder) | 1.22 | ○ | 1.14 | X |
| Left arm: horizontal in swing-down motion | Shaft line should be parallel with original shaft line (degree) | 21 | ○ | −27 | X |
| | Position of grip (mm) | −180 | ○ | −325 | X |

TABLE 2-2-continued

| Image photographed rearward in ball fly line | | Professional golfer A | | Professional golfer B | |
|---|---|---|---|---|---|
| Swing posture | Evaluation item | Numeric data | Diagnosis | Numeric data | Diagnosis |
| Shaft: 9 o'clock state | Shaft line is on swing plane (mm) | −79 | ○ | −123 | ○ |
| Impact | Change of spine angle (degree) | 0 | ○ | 12 | ○ |
| | Change of knee angle (degree) | −21 | ○ | 3 | ○ |
| | Rotation amount of waist (degree) | 42 | ○ | 47 | ○ |
| | Rotation amount of shoulder (degree) | 18 | ○ | 22 | ○ |

TABLE 2-3

| Image photographed rearward in ball fly line | | Professional golfer C | | Professional golfer D | |
|---|---|---|---|---|---|
| Swing posture | Evaluation item | Numeric data | Diagnosis | Numeric data | Diagnosis |
| Address | Position of right shoulder with respect to thenar (mm) | 59 | ○ | 94 | ○ |
| | Position of right knee with respect to thenar (mm) | 7 | ○ | −21 | ○ |
| | Position of grip (mm) | 122 | ○ | 148 | ○ |
| Shaft: 8 o'clock state | Original plane of shaft is traced (degree) | −7 | ○ | −8 | ○ |
| | Position of grip (mm) | −22 | ○ | 25 | ○ |
| Left arm: horizontal | Orientation of grip end | −306 | X | −644 | X |
| | Height of both elbows (mm) | 12 | ○ | 92 | X |
| | Position of shaft (mm) | 28 | ○ | −32 | X |
| | Position of shoulder (degree) | 92 | ○ | 84 | ○ |
| Top state | Left knee should not project | 162 | ○ | 202 | ○ |
| | Right knee should not project | −87 | X | −53 | X |
| | Parallelism between straight line connecting left wrist and right elbow to each other and spine line (degree) | 27 | ○ | −5 | ○ |
| | Position of left wrist (mm) | −127 | ○ | −72 | ○ |
| | Parallelism between shaft line and target direction (degree) | 22 | ○ | −27 | ○ |
| | Height of both elbows (mm) | 12 | ○ | 21 | ○ |
| | Height of grip (ratio of height of left wrist to height of left shoulder) | 1.27 | X | 1.19 | ○ |
| Left arm: horizontal in swing-down motion | Shaft line should be parallel with original shaft line (degree) | 28 | ○ | −7 | ○ |
| | Position of grip (mm) | −227 | ○ | −132 | ○ |
| Shaft: 9 o'clock state | Shaft line is on swing plane (mm) | −204 | ○ | −199 | ○ |
| Impact | Change of spine angle (degree) | −11 | ○ | 14 | ○ |
| | Change of knee angle (degree) | −21 | ○ | −32 | ○ |
| | Rotation amount of waist (degree) | 51 | ○ | 38 | ○ |
| | Rotation amount of shoulder (degree) | 10 | X | 16 | ○ |

TABLE 2-4

| Image photographed rearward in ball fly line | | Professional golfer E | |
|---|---|---|---|
| Swing posture | Evaluation item | Numeric data | Diagnosis |
| Address | Position of right shoulder with respect to thenar (mm) | 168 | X |
| | Position of right knee with respect to thenar (mm) | −42 | X |
| | Position of grip (mm) | 131 | ○ |
| Shaft: 8 o'clock state | Original plane of shaft is traced (degree) | 3 | ○ |
| | Position of grip (mm) | 27 | ○ |
| Left arm: horizontal | Orientation of grip end | −563 | X |
| | Height of both elbows (mm) | −10 | ○ |
| | Position of shaft (mm) | 85 | ○ |
| | Position of shoulder (degree) | 96 | ○ |
| Top state | Left knee should not project | 70 | ○ |
| | Right knee should not project | −50 | X |

TABLE 2-4-continued

| Image photographed rearward in ball fly line | | Professional golfer E | |
|---|---|---|---|
| Swing posture | Evaluation item | Numeric data | Diagnosis |
| | Parallelism between straight line connecting left wrist and right elbow to each other and spine line (degree) | −25 | ○ |
| | Position of left wrist (mm) | 74 | ○ |
| | Parallelism between shaft line and target direction (degree) | 19 | ○ |
| | Height of both elbows (mm) | −7 | ○ |
| | Height of grip (ratio of height of left wrist to height of left shoulder) | 1.21 | ○ |
| Left arm: horizontal in swing-down motion | Shaft line should be parallel with original shaft line (degree) | −17 | ○ |
| | Position of grip (mm) | −177 | ○ |
| Shaft: 9 o'clock state | Shaft line is on swing plane (mm) | −177 | ○ |
| Impact | Change of spine angle (degree) | −18 | ○ |
| | Change of knee angle (degree) | −22 | ○ |
| | Rotation amount of waist (degree) | 41 | ○ |
| | Rotation amount of shoulder (degree) | 20 | ○ |

As shown in tables 1 and 2, based on coordinate data obtained from photographed swing images of the professional golfer and the five unprofessional golfers A through E, numeric data used as the evaluation items was computed. The numeric data was compared with the ideal values. If the numeric data falls within the range of the ideal value, ○ is outputted, whereas if the numeric data does not fall within the range of the ideal value, X is outputted.

As shown in tables 1 and 2, in the swing of the professional golfer, ○ is outputted in all the evaluation items. On the other hand, in the swing of the unprofessional golfers A through E, ○ and X are outputted in dependence on the unprofessional golfers A through E. The unprofessional golfers A through E can make progress effectively by preponderantly correcting their defects, namely, by correcting the evaluation items diagnosed as X.

As apparent from the foregoing description, according to the present invention, by forming the reference points to be measured on the golf club shaft at two or more positions thereof spaced from each other in the longitudinal direction thereof, it is possible to securely measure the movement of a golf club. Further by setting the reference points at mainly joints, it is possible to analyze the golfer's behavior with high accuracy when the golfer swings. By expressing the evaluation items in a specified golfer's posture by numeric values from the coordinate data of the reference points and judging whether the numeric data falls within the range of the ideal value inputted in advance by comparing both with each other. Thereby results of the diagnosis of the golfer's swing is outputted for each of the evaluation items.

The evaluation items to be checked include the position and angle of each of a shaft, the golfer's spine, the golfer's wrist, both elbows, both shoulders, both waists, both knees, and grip, and movement of weight. As the swing postures to be evaluated include any one of the addressing state, the state in which the shaft is the eight o'clock state, the state in which the left arm is horizontal, the top state, the state in which the left arm is horizontal in the swing-down motion, and the impact state. Thereby it is possible to obtain appropriate results of the diagnosis of the golf swing.

What is claimed is:

1. A golf swing diagnosis system comprising:
   a photographing unit configured to photograph a swing moving image in a color image when a golfer swings;
   a capturing unit configured to capture said photographed color image into a computer;
   a recognizing unit configured to recognize at least two reference points which are specified in colors on said color image of said computer and are spaced at a given interval in a longitudinal direction of a golf club shaft gripped by said golfer, and to recognize one or more reference points which are specified in colors, move during said swing, and are selected from among a golfer's head, neck, right shoulder, left shoulder, right elbow, left elbow, left wrist, right wrist, right waist, left waist, right knee, left knee, right ankle, left ankle, right toe, and left toe;
   a converting unit configured to convert said swing moving image into a plurality of still images;
   a computing unit configured to compute a plurality of evaluation items to be checked including a swing posture and a shaft angle in a range from an addressing state till an impact state to express said evaluation items by numeric values, based on coordinate data of each of said reference points, disposed on a plurality of said still images, which are discriminated in said colors; and
   a diagnosing unit configured to diagnose said golfer's swing by comparing said data expressed by numeric values with judging data inputted to said computer in advance as ideal values,
   wherein said golfers swing is photographed by two cameras at a position forward from said golfer and at a position rearward from said golfer in a ball fly line to obtain a front image and a rear image along said ball fly line, whereby two-dimensional coordinate data is obtained or three-dimensional coordinate data is obtained by converting a photographed image on said computer.

2. The golf swing diagnosis system according to claim 1, wherein said specified colors to be discriminated as said reference points are colors attached to said shaft as a design, colors of golfer's clothes or colors applied to said shaft or said golfer at a photographing time.

3. The golf swing diagnosis system according to claim 1, wherein said reference points which are specified in colors and move during said golfer's swing include said golfer's wrist and elbow of an arm opposite to those of said golfer's skillful arm.

4. The golf swing diagnosis system according to claim 1, wherein the number of said reference points which are specified in colors is not less than three nor more than 18.

5. The golf swing diagnosis system according to claim 1, wherein said evaluation items to be checked include a shaft angle, an angle of said golfer's wrist, a position and an angle of said golfer's spine, both elbows, both shoulders, both waists, both knees, and grip which are computed from said coordinate data on each still image.

6. The golf swing diagnosis system according to claim 1,
   wherein said evaluation items to be checked include any one of a position of said golf ball, a width of said golfer's both ankles, an angle of said golfer's wrist, a position of said golfer's head, both waists, and grip viewed forward from said golfer;
   and a position of an axis of said golfer's spine, an angle of said spine, an angle of said knee, a position of both waists, both elbows, both shoulders, both knees, and both toes, and her/his grip, and a swing plane viewed at said position rearward from said golfer along said ball fly line.

7. The golf swing diagnosis system according to claim 1, wherein when said golfer is viewed forward or/and rearward from said golfer, a swing posture of said evaluation item of said checking point includes any one of an addressing state, a state in which a shaft is an eight o'clock state, a state in which an arm opposite to a skillful arm is parallel with the ground, a top state, a state in which said arm opposite to said skillful arm is parallel with the ground in a swing-down motion, a state in which said shaft is in a nine o'clock state of a down-swing when a movement of said shaft is regarded as a movement of a hand of a clock, and an impact state.

8. The golf swing diagnosis system according to claim 7, wherein said eight o'clock state of said shaft means a state of a swing posture when a grip intersects with a perpendicular line to a right side of a right leg.

9. The golf swing diagnosis system according to claim 1, wherein said diagnosing unit has a plurality of judging data having ideal values in dependence on handicap at golf, golf career, sex, age, height, weight, and a golfer's tendency of a hit-ball direction inputted to said computer in advance; and said diagnosing unit selects appropriate judging data from a plurality of said judging data and compares said golfer's numeric data obtained by photographing said golfer's swing with said selected judging data.

10. The golf swing diagnosis system according to claim 1, wherein at a time of a shot of a golf ball in said photographed swing, ball-hitting conditions including a ball speed, a deviation angle, a launch angle, and a spin amount are measured.

11. The golf swing diagnosis system according to claim 1, wherein at least one unoperative reference point which does not move from an addressing till an impact is specified in a color to evaluate movements of said other reference points relative to said unoperative reference point.

12. The golf swing diagnosis system according to claim 1, wherein the at least one unoperative reference point comprises a point on the golf ball or corresponding golf tee.

13. The golf swing diagnosis system according to claim 1, wherein the at least two reference points are manually selected using a computer to thereby confirm each of the least two reference points have been recognized by the computer.

14. The golf swing diagnosis system according to claim 3, wherein a number of the reference points on the arm opposite to the golfer's skillful arm is greater than that of reference points on the golfer's skillful arm.

15. A golf swing diagnosis system comprising:

a photographing unit configured to photograph a swing moving image in a color image when a golfer swings;

a capturing unit configured to capture said photographed color image into a computer;

a recognizing unit configured to recognize at least two reference points which are specified in colors on said color image of said computer and are spaced at a given interval in a longitudinal direction of a golf club shaft gripped by said golf, and to recognize one or more reference points which are specified in colors, move during said swing, and are selected from among a golfer's head, neck, right shoulder, left shoulder, right elbow, left elbow, left wrist, right wrist, right waist, left waist, right knee, left knee, right ankle, left ankle, right toe, and left toe;

a converting unit configured to convert said swing moving image into a plurality of still images;

a computing unit configured to compute a plurality of evaluation items to be checked including a swing posture and a shaft angle in a range from an addressing state till an impact state to express said evaluation items by numeric values, based on coordinate data of each of said reference points, disposed on a plurality of said still images, which are discriminated in said colors; and a diagnosing unit configured to diagnose said golfer's swing by comparing said data expressed by numeric values with judging data inputted to said computer in advance as ideal values, wherein at least one unoperative reference point which does not move from an addressing till an impact is specified in a color to evaluate movements of said other reference points relative to said unoperative reference point.

* * * * *